June 30, 1970    S. S. AIDLIN ET AL    3,517,796
AUTOMATIC APPARATUS FOR ORIENTING AND FEEDING BOTTLES AND THE LIKE Filed Aug. 14, 1968    2 Sheets-Sheet 1

United States Patent Office 3,517,796
Patented June 30, 1970

3,517,796
AUTOMATIC APPARATUS FOR ORIENTING AND FEEDING BOTTLES AND THE LIKE
Samuel S. Aidlin, New York, N.Y. (214 Beaumont St., Brooklyn, N.Y. 11235), and Stephen H. Aidlin, New York, N.Y. (3855 Shore Parkway, Brooklyn, N.Y. 11235)
Filed Aug. 14, 1968, Ser. No. 752,581
Int. Cl. B65g 47/24
U.S. Cl. 198—33                               12 Claims

ABSTRACT OF THE DISCLOSURE

In a hopper feed apparatus for gravitationally feeding bottles or the like having a neck portion, including a grooved feed ring, a chute for receiving and conveying properly oriented bottles discharged from the grooves of the ring at the upper portion of the hopper and fraction means preventing misoriented bottles from being discharged from said grooves into the chute, a second chute for receiving said misoriented bottles and discharging them back into the grooves of said ring at the lower portion of the hopper, whereby said misoriented bottles are presented in oriented position when the grooves receiving them reach the upper portion of the hopper. In one form of the invention, each groove is capable of receiving one or more bottles, end to end, and the hopper is provided with a corresponding number of sets of conveying and returning chutes.

---

Figure 1:
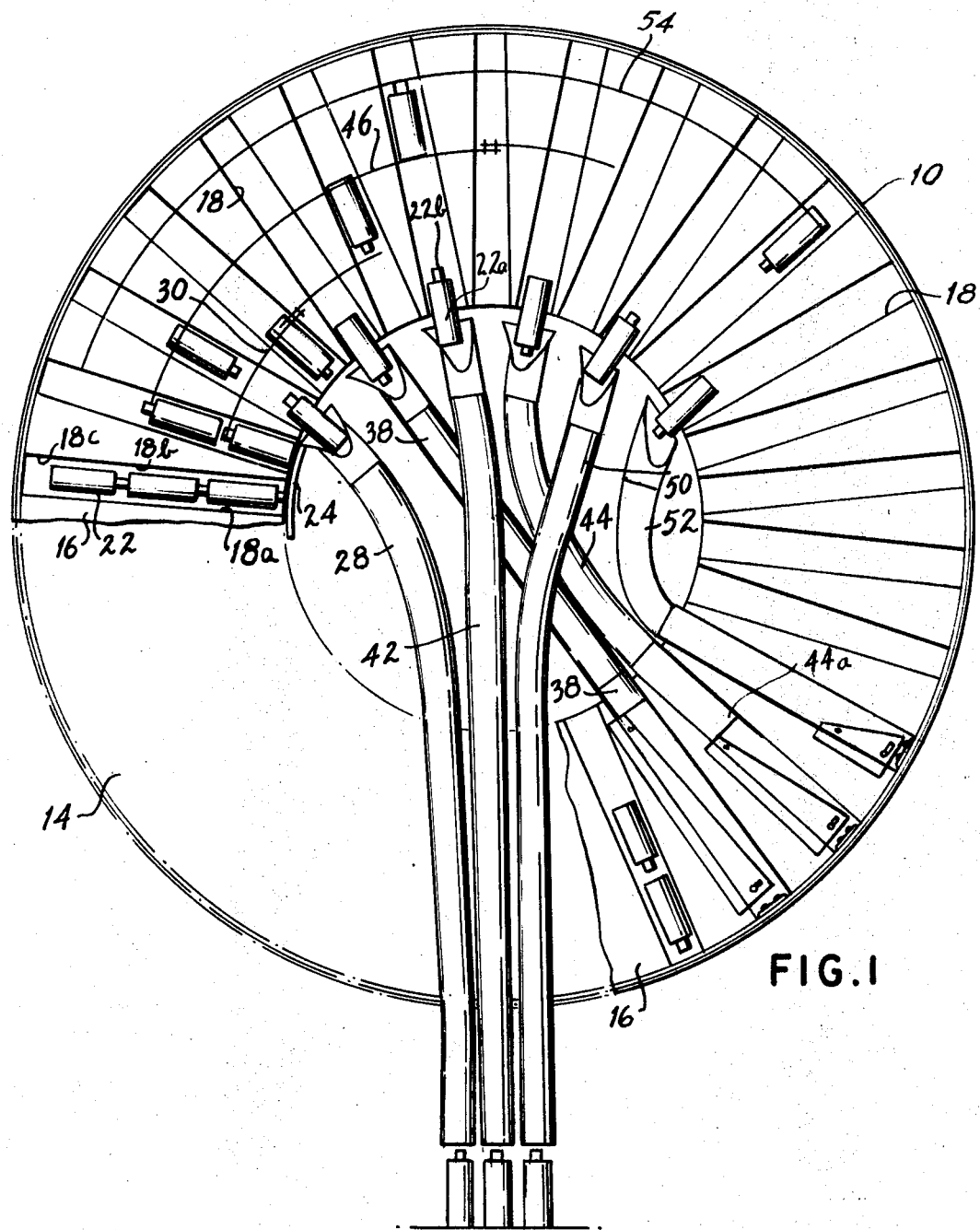

The present invention relates to apparatus for feeding articles having portions of greater cross-section and lesser cross-section, such as bottles having necks, in uniformly oriented position, as with their thicker portions down, to a point of destination, and is an improvement over the apparatus decsribed and claimed in Pat. No. 3,249,203 dated May 3, 1966 issued to Samuel S. Aidlin.

In the said patent there is described and claimed a hopper-type feeding apparatus which includes a tilted hopper having a peripheral rotating grooved conveyor ring at its bottom that picks up, in its grooves, bottles or the like from the bottom of the hopper and discharges them into a chute when the bottles reach the top of the hopper. Friction means are arranged at the top of the hopper, over the ring, in position to frictionally engage the thicker portion of a misoriented bottle to prevent it from dropping into the chute and is disposed over the reduced portion of the bottle, as the neck, when the bottle is in properly oriented position within the groove; the frictionally-held bottle being freed from the friction means after it is rotated past the inlet into the chute.

Under the law of probability, over any given period of time, the feeding ring will have half of the bottles picked by it properly oriented for feeding into the chute, and the other half of them improperly oriented, to be returned to the bottom of the hopper.

It is the principal object of the present invention to provide apparatus of the type described which will ensure that the feeding ring will bring a greater percentage of properly oriented articles to the top of the hopper for feeding into an outlet chute, to thereby increase the efficiency of the apparatus and speed up the feeding of oriented bottles therefrom, without the need for increasing the speed of rotation of the feeding ring thereof.

It is another object of the present invention to provide apparatus, of the character described, in which the grooves of the feeding ring can each accommodate more than one of the articles and in which each properly oriented of the articles in each groove may be discharged into an outlet chute, to thereby increase further the efficiency of the apparatus and its rate of feeding the oriented articles.

It is still another object of the present invention to provide apparatus, of the character described, having grooves in which multiple articles may be picked up and in which the percentage of bottles presented for feeding into a chute by each of the tiers in the grooves is increased over the 50% probability set forth above.

It is a further object of the present invention to provide apparatus, of the character described, which will assure smooth and even operation without clogging and, therefore, require a minimum of care by an attendant.

The foregoing and other objects and advantages of the apparatus of the present invention will become more readily apparent to those skilled in the art from the embodiments thereof shown in the accompanying drawings, and from the description following. It is to be understood, however, that such embodiments are shown by way of illustration only, to make the principles and practice of the invention more readily comprehensible and without any intent of limiting the invention to the specific details therein shown.

Figure 2:
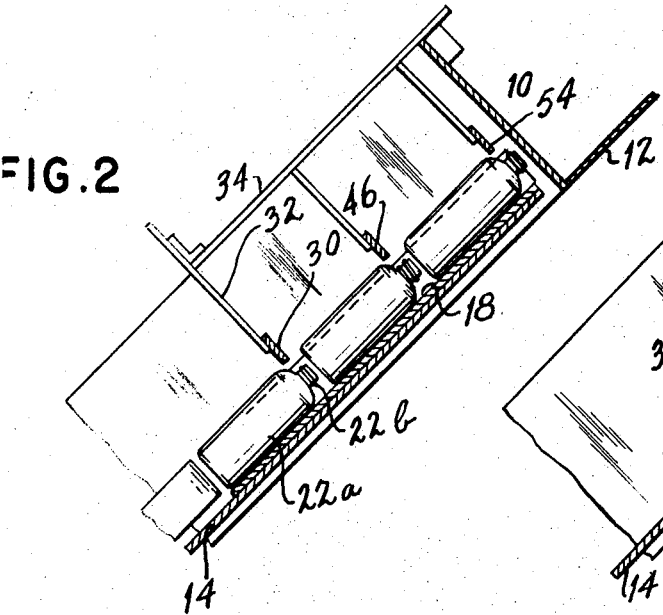
Figure 3:
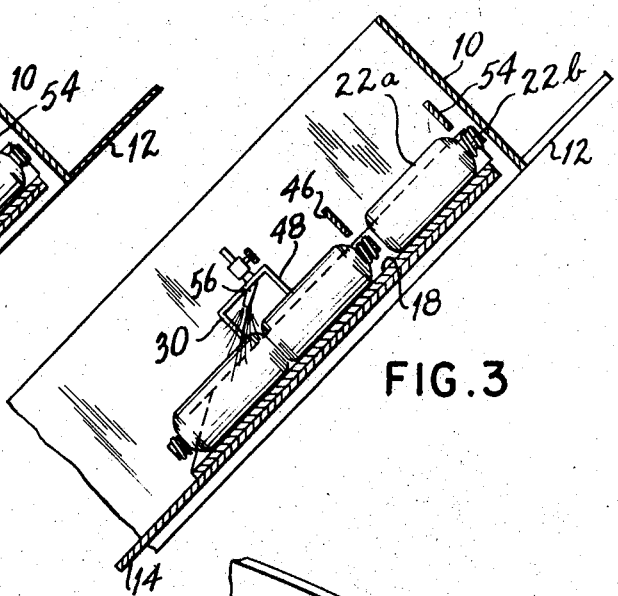
Figure 4:
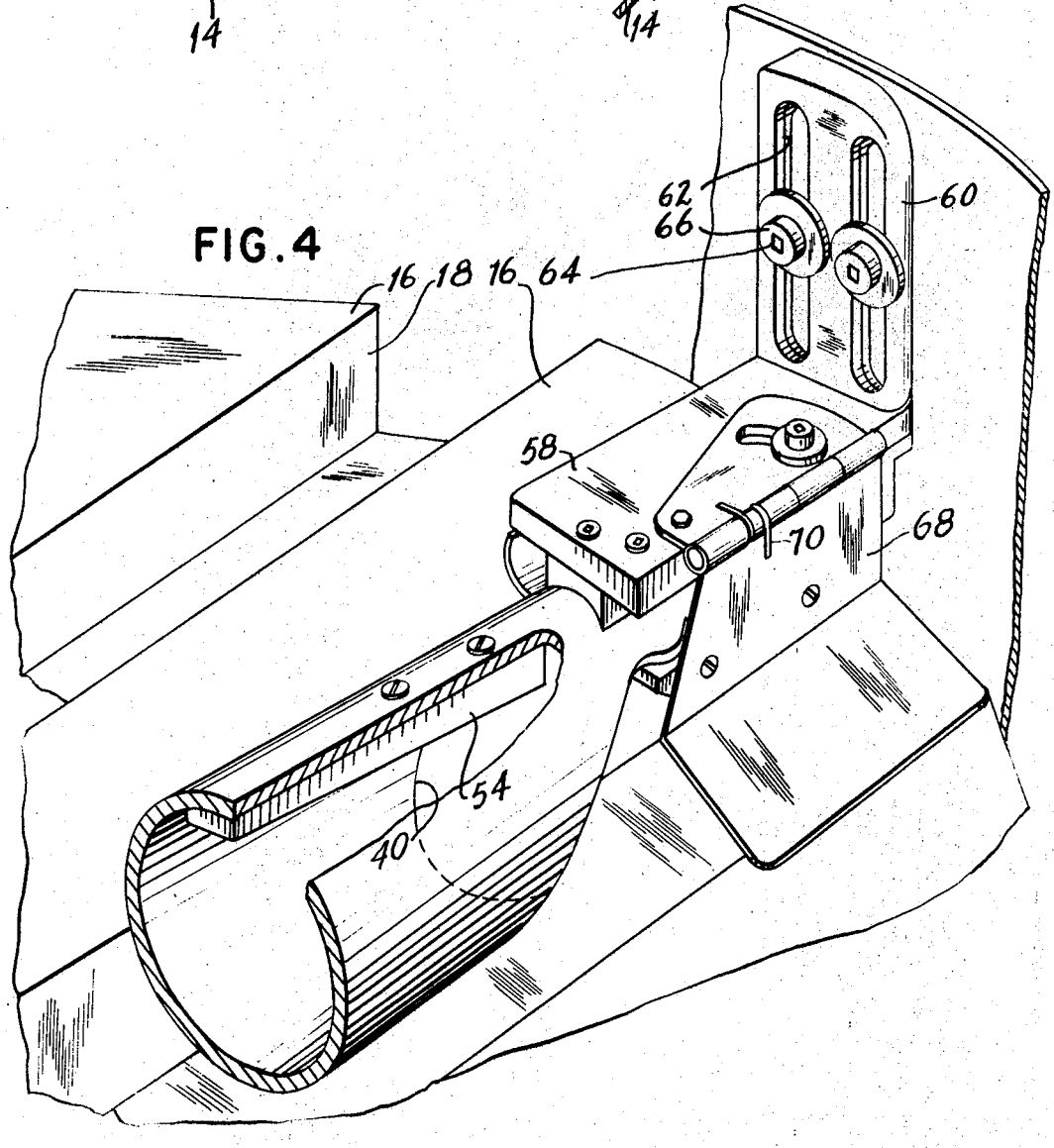

In the drawings:
FIG. 1 is a top plan view of one embodiment of the apparatus of the present invention showing a form of the apparatus having grooves capable of moving and discharging a multiplicity of articles, at one time;

FIGS. 2 and 3 are sections, respectively, taken on lines 2—2 and 3—3 of FIG. 1 of the apparatus; and FIG. 4 is a fragmentary, partly sectional, perspective view, on an enlarged scale, showing details of a mechanism for ensuring the return of a misoriented article into a groove of the rotating feeding ring.

Generally stated, the present invention contemplates the provision of means for returning articles unfed into the outlet chute for orienting articles into a secondary, inverting chute leading from the top of the hopper feed to a point overlying the feeding ring, to discharge such article into a groove, in arrangement to be in oriented, feeding position when it next passes an outlet chute of the hopper. The friction means for engaging misoriented articles extends to a point short of the upper edge of the inverting chute, to release said misoriented article into said inverting chute.

Referring now, in greater detail, to the embodiment of the invention illustrated in the drawings, the apparatus of the present invention comprises a hopper which may consist of a cylindrical housing, 10, formed with outwardly-extending flanges, 12, at the bottom, by which it may be supported on a supporting frame (not shown) at an angle, as at 45°, to the horizontal, and having disposed at its bottom a rotating disc, 14, on which is secured, peripherally, a feeding ring, 16, of substantial thickness, but less than the thickness of the thicker portions of the article to be fed, and in which are formed radial grooves, 18, for picking up, and conveying articles to be fed from a loose pile at the bottom of the hopper; the grooves 18 being of a uniform width to accommodate the thicker portion of an article to be fed, and of a depth less than such thickness. The structure for supporting the hopper and for supporting and rotating disc 14 may be of conventional type, not thought necessary to be specifically illustrated and described.

While the feed ring 16 may be of a width sufficient to accommodate the length of a single article to be fed, such as a bottle, generally designated as 22, having a relatively thicker body portion, 22a, and a reduced neck portion, 22b, the illustrated embodiment of the drawings show such ring of a width sufficient to accommodate in each of grooves 18 a tier of more than one bottle, such as three bottles, as illustrated, end to end. To that end, grooves 18 may be each described as having an inner area, 18a, closest to the center of the disc 14, for carrying the innermost of the bottles in a tier; a central area, 18b, for carrying the centrally-disposed bottle of the tier, and an outer area, 18c, for carrying the outermost bottle of the tier.

In the illustrated embodiment of the invention, the apparatus is intended to have its ring rotate in a clockwise direction and there is provided at the inner edge of the ring, for a short distance above the "9 o'clock" position, a fixed guard wall, 24 for preventing the gravitational dropping out of bottles 22 from grooves 18, as such grooves move into the upper left-hand corner of the hopper, from the "9 o'clock" position.

Where the apparatus is intended to feed bottles in tiers of three, as illustrated, the guard wall 24 extends only a short distance sufficient to have bottles conveyed past it drop out gravitationally from the grooves 18. Disposed and supported in the hopper in any suitable manner is a chute, 28, whose preferably flared opening extends from the inner edge of the feed ring 16 at the point adjacent the upper end of guard wall 24, to the exterior of the hopper. A horizontally-disposed friction element, 30, is supported by one or more upwardly-extending rods connected at their upper ends to arms, 34, that are supported, as on the wall of the cylindrical housing 10, in substantially parallel relation to disc 14. Friction element 30 is arranged in position to frictionally engage the thicker portion 22a of a misoriented bottle; namely, one disposed in groove position 18a with its neck portion 22b directed towards the center of the hopper, and to overlie, without contacting, the neck portion 22a of a properly oriented bottle whose neck portion is outwardly directed, to permit such bottle to drop out of its groove into the chute 28. The friction element 30 is curved and of a length to extend from a point overlapping guard wall 24 to a point past the opening of chute 28. Immediately adjacent the point of termination of guard wall 24, there is provided a second or return chute, 38, into which a misoriented bottle 22 released from friction element 30 may drop, with its neck portion foremost. Return chute 38 instead of leading to the exterior of the hopper, as does chute 28, is directed to have its end portion, 38a, radially disposed in position to overlie a point on the lower half of the feed ring 16. The bottom portion of the chute 38 is cut away, as at 40, to provide an opening from which the originally misoriented bottle 22 may drop into a groove 18 passing thereunder. It will be obvious that such bottle will drop into the groove in the lower half of the hopper, at any point between a slight distance below the "3 o'clock" position to a slight distance before the "9 o'clock" position, with its neck outwardly pointing. It will also be obvious that when the groove 18 into which such misoriented bottle drops reaches a point slightly above the "9 o'clock" position, such originally misoriented bottle will now be in properly oriented position with its neck portion directed towards the periphery of the hopper and thicker portion facing the interior thereof. It will also be plain that the presence of the inverted bottle received from a chute in any groove 18 will prevent such groove from picking up any haphazardly oriented bottle from the tier at the bottom of the hopper, thereby reducing the number of misoriented bottles reaching a discharge point and correspondingly increasing the number of properly oriented bottles fed from the hopper.

A second pair of chutes is provided to the right of chutes 28 and 38, for servicing bottles 22 disposed in the intermediate tier, in area 18b of grooves 18. This pair of chutes consists of an outlet chute, 42, immediately to the right of chute 38, and an inverting chute, 44, to the right of chute 42. The chutes 42 and 44 preferably each lies to one side of the vertical axis of the hopper, and inverting chute 44 is preferably curved to the right and its straight end, 44a, is radially disposed in upward relation to inverting chute 38. Inverting chute 44 is likewise formed with a bottom cutaway, 40, at its end, through which the article fed thereby will drop into a groove 18 passing thereunder.

In order to permit bottles from area 18b to drop only into chute 42 when properly oriented and into chute 44 when misoriented, a second friction element, 46, is provided, which may be supported in a manner similar to that of friction element 30; such element 46 preferably extending from a point radially in line with the opening into chute 28 to a point radially past chute 44.

Means may be provided for preventing a properly oriented bottle in tier 18b from escaping its groove before it reaches a point opposite chute 42, as into the chute 38. Such means may comprise a friction element, such as 48 (FIG. 3) which may be co-mounted with friction element 30 to overlie groove area 18b at a point where it will contact the thicker portion 22a of both oriented and misoriented bottles; such friction element 48 extending past the opening of chute 42 to a point radially opposite the advance edge of the opening into chute 44.

A third pair of chutes may be provided for servicing the third and outer tier bottles disposed in groove area 18c. These include discharge chute, 50, to the right of chute 44 and inverting chute, 52, to the right of discharge chute 50. The latter is formed with a straight end that is radially disposed over feed ring 16, in upper relation to chute 44. Chute end 52 is likewise formed with an opening 40 at its bottom through which a misoriented bottle conveyed by it will drop into a groove 18.

A friction element, 54, is provided for frictionally engaging a misoriented bottle extending from a point radially in advance of the opening into chute 50, so that it may first drop out from its groove when in position over the opening into chute 52.

In order to positively direct bottles from the radial portion of each of the inverting chutes 28, 44 and 52, through their cut-away portions 40, into a passing groove 18, there may be set within such chute portion at its uppermost point, immediately in advance of and overlying the cutaway 40, a shim or wedge-shaped bar, 54, which thickens outwardly, so that as a bottle approaches opening 40 it will be directed by wedge-shaped bar 54 downwardly to move into a passing groove 18.

In order to expedite discharge of bottles into the various chutes provided in the apparatus, air jet streams may be provided opposite the various chutes, especially those opening closer to the "3 o'clock" and "9 o'clock" positions, as indicated at 56, in FIG. 4. It will be understood that such jet may be fixedly supported in any desired manner, so that its air stream is directed at the desired article, at the desired point and in the desired direction.

Means may also be provided for sweeping a bottle 22 that is discharged from the end of an inverting chute into a partition between grooves 18, or over an already filled groove, instead of into a vacant groove. Such means may comprise a plate, 58, supported adjustably and horizontally above the radial end of each of the inverting chutes. Plate 58 may be supported by the upright plate, 60, connected to its outer end in which are formed one or more slots, 62, which may be fitted over a bolt or bolts, 64, set into the wall of the cylindrical housing 10; the upright plate 60 being held in place against the wall of housing 10 by nuts, 66. Hinged on the forward longitudinal edge of the plate 60 is a skirt plate, 68, which is normally tensioned in perpendicular relation to the surface of the feed ring 16, as by torsion spring, 70. Plate 60 is normally held in elevated relation above feed ring 16 a distance greater than the thickness of a bottle 22, so that in the event a bottle is dropped on top of a partition between grooves 18, or on top of another bottle within a groove 18, plate 68 will sweep it rearwardly until it overlies a vacant portion of a groove 18 wherein it will drop. Jamming is avoided by the tiltability of hinged plate 68.

It will be understood that in all instances, regardless of the number of sets of discharge and inverting chutes provided in the apparatus, such chutes will be arranged to attain maximum gravitational pull for the discharge of articles through them, with their openings located as closely as possible to the vertical axis of the hopper. Thus, when two sets of discharge and inverting chutes are provided, each set will be arranged to one side of such vertical axis. If only one set of such chutes is provided in the apparatus, each one of the chutes will be arranged to one side of such axis.

This completes the description of the feeding apparatus for oriented articles having an end portion of lesser thickness than another portion thereof. It will be readily apparent that, by the provision of an inverting chute that returns misoriented articles directly into the feeding ring to be presented in oriented position on the next rotation thereof, instead of returning such misoriented articles to the pile at the bottom of the hopper, the percentage of articles fed by the ring in oriented position for discharge from the hopper is materially increased, to thereby increase the feeding capacity of the hopper. It will also be apparent that by feeding articles in tiers of more than one and providing a corresponding number of discharge and inverting chute sets, the feeding capacity of the apparatus will be additionally multiplied, at a great saving in cost as compared to the cost of the multiplicity of apparatus heretofore required for comparable feeding capacity, as well as at a substantial saving in floor space.

It will be further apparent that numerous modifications and variations may be made in the hopper feeding apparatus of the present invention by anyone skilled in the art, without the exercise of any inventive ingenuity. We desire, therefore, to be protected for any and all such modifications and variations that may be made within the spirit of the invention and scope of the claims hereto appended.

What we claim is:

1. In a hopper feed apparatus, of the character described, for the automatic feeding of articles having one end portion of lesser thickness than the other end portion thereof, said apparatus including a hopper having a bottom disposed at an angle to the horizontal and a rotatable peripheral feeding ring at said bottom, said ring having radially-extending, article-receiving grooves formed in its upper surface and opening into the inner edge thereof, said grooves of a length equal at least to the length of one article to be fed and of a depth less than the depth of such article, whereby said thicker portion projects above the surface of said ring, a chute arranged to receive an article discharged from a groove disposed in an upper position within said hopper for discharging the same from the hopper, means on the ring-ascending side of said hopper for closing the inner end of said grooves up to the point of the opening of said chute and means fixedly supported on said hopper arranged to overlie the reduced end of an article disposed in a groove when the thicker portion thereof is disposed at the inner end of said groove and to frictionally engage said thicker end of an article disposed within a groove when its reduced end is disposed at said inner end, said means terminating to a point past the opening of said chute, the improvement consisting of a second chute having an end portion radially disposed within said hopper and overlying said ring, the underside of said end portion being cut away to permit an article fed onto said second chute to drop into said ring.

2. The hopper feed apparatus of claim 1, wherein said radially-disposed end of said second chute extends into the quarter of the apparatus first encountered by a groove on said ring leaving the upper portion of the hopper.

3. The apparatus of claim 1, wherein means are provided for sweeping articles dropped from said chute in a space between adjacent grooves, back into another groove moving under said chute end.

4. The apparatus of claim 3, wherein said sweeping means comprises a wiping plate mounted adjacent the side of said radial chute end facing the bottom of said hopper, in front of the cut-away portion of said chute end, said wiping plate disposed in a plane substantially normal to the plane of said feed ring with the lower edge thereof in proximity to the surface of said feed ring.

5. The apparatus of claim 4, wherein said plate is hingedly supported by its upper edge for movement in the direction of the lower portion of the chute, and means are provided for normally resiliently tensioning said plate into normal relation to the plane of said feed ring.

6. The apparatus of claim 5, wherein an arm is supported on said hopper in substantially radial relation above said second chute end, and a hinge connects the upper edge of said plate to an edge of said arm, and wherein said resilient means comprises a torsion spring associated with said hinged.

7. The apparatus of claim 1, wherein a wedge element is supported within said radial chute end at the top thereof, said wedge element extending from a point closely adjacent the cut-away portion thereof over said cut-away portion with the thicker end thereof outwardly directed, whereby an article moving through said chute end is downwardly directed towards said feed ring through said cut-away portion.

8. The apparatus of claim 1, wherein means are provided for directing a fluid under pressure against said articles for expediting their movement from a groove into a chute.

9. The apparatus of claim 1, wherein each said groove is of a length to accommodate a plurality of articles end to end and wherein there is provided a corresponding plurality of sets of said chutes, each said set including a first chute for conveying a properly oriented article out of the hopper, and a second chute having a radial end portion extending over said feed ring and having its bottom portion cut away for conveying an improperly oriented article to a groove in said feed ring; the innermost of the articles in a groove adapted to be discharged into the set of chutes first encountered by a groove in its ascending movement into the upper portion of the hopper and each article in a groove successively above said first article adapted to be discharged into a set of hoppers successively adjacent to the set of chutes for receiving articles immediately inwardly of said articles within a groove.

10. The apparatus of claim 6, wherein the radial end of each second chute in each said set of chutes extends into the quarter of the lower portion of the hopper first encountered by a groove of the rotating feed ring after it passes the upper half of said hopper, the radial ends of the second chutes of said successive sets of chutes being disposed in inverse position within said hopper quarter, with the radial end of said second chute of the said first set disposed in lowermost position within said hopper quarter.

11. The apparatus of claim 10, wherein means are provided for frictionally engaging said article in said grooves above the innermost thereof until past the sets of chutes for receiving articles inwardly thereof within said grooves.

12. In hopper feed apparatus of the character described for feeding articles having an end portion of lesser thickness than another portion thereof, including a rotary feed ring having grooves for receiving and conveying articles to a discharge chute for gravitational discharge of properly oriented articles from the hopper, the improvement of having a feed ring the grooves whereof are of a length to accommodate a plurality of articles end to end, a plurality of chutes corresponding in number to the number of articles disposable within a groove, said chutes arranged to receive in succession, the articles successively discharged from the groove, and friction means for engaging the thicker portion of each misoriented article in each groove against discharge from said groove until a point where the groove passes the chute for receiving said article.

References Cited

UNITED STATES PATENTS

| 2,433,096 | 12/1947 | Davis | 221—160 |
| 2,639,034 | 5/1953 | Roeber | 221—160 |
| 3,249,203 | 5/1966 | Aidlin. | |
| 3,338,373 | 8/1967 | Aidlin et al. | |

ANDRES H. NIELSEN, Primary Examiner